INVENTORS.
Juan L. Rayces
Francis W. Foster
BY Raul E. Casas

Irving M. Kriegsman
ATTORNEY.

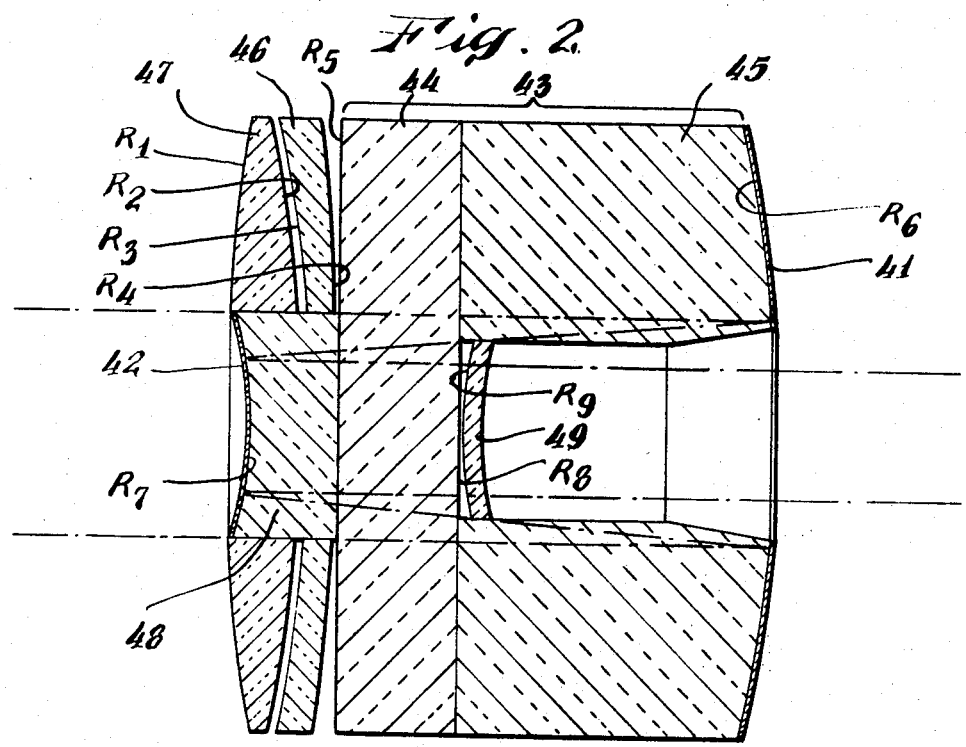
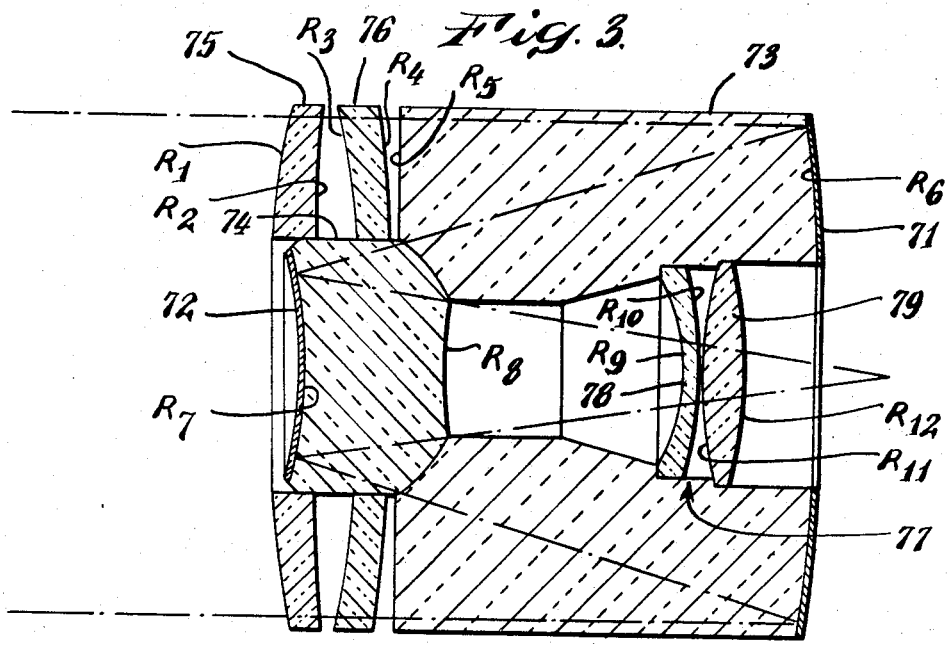

United States Patent Office 3,547,525
Patented Dec. 15, 1970

3,547,525
CATADIOPTRIC SYSTEM
Juan L. Rayces, Santa Ana, Calif., and Francis W. Foster, West Redding, and Raul E. Casas, Danbury, Conn., assignors to The Perkin-Elmer Corporation, Norwalk, Conn., a corporation of New York
Filed Aug. 31, 1967, Ser. No. 664,683
Int. Cl. G02b 17/08
U.S. Cl. 350—200          3 Claims

ABSTRACT OF THE DISCLOSURE

An optical system especially suited for use as a photographic objective in which a concave primary mirror is located at one end of a solid support assembly and a convex secondary mirror is located at the other end of the solid support assembly. Both mirrors are spherical. The support assembly is made of refractive material and constitutes the only medium through which light reflected by the primary mirror is transmitted to the secondary mirror. Light reflected by the secondary mirror passes through a central aperture in the primary mirror. The objective has additional refractive components located in front of the primary mirror and behind the secondary mirror which cooperate with the refractive support assembly to correct aberrations and/or increase the effective focal length of the system and an axially movable doublet for changing the focus of the system.

BACKGROUND OF INVENTION

This invention relates to catadioptric systems. More specifically this invention relates to a catadioptric system containing a primary mirror having a centrally located aperture for collecting light and a secondary mirror positioned behind the primary mirror for receiving light reflected by the primary mirror and directing the reflected light back through the centrally located aperture. The system is particularly suited for, but not exclusively limited to, use as a photographic objective.

The classical Cassegrain telescope, as is well known in the art, is a two mirror system consisting of a concave parabolic shaped primary mirror having a centrally located aperture and a convex hyperbolic shaped secondary mirror. Such a telescope is free from spherical and chromatic aberrations and thus provides the ultimate in on-axis imagery. Unfortunately, however, it does have several shortcomings which limit its usefulness as a photographic objective. For example, its performance deteriorates so rapidly as one goes off-axis, that it is rarely used when high resolution is required over an extended field. Secondly, its surfaces are aspheric which are more difficult and expensive to fabricate than spherical surfaces. Thirdly, the system is rather difficult to initially align and then maintain aligned when being used. Finally, its overall length does not make it particularly suited for use as a photographic objective.

Modified versions of the Cassegrain telescope, in which spherically shaped mirror surfaces are used in place of the aspheric shaped mirror surfaces with various corrector elements added to compensate for the image defects thus introduced, have been repeatedly proposed. One such arrangement is shown in U.S. Pat. 2,726,574. Other arrangements may be found in U.S. Pat. 3,119,892 and U.S. Pat. 3,252,373.

SUMMARY OF INVENTION

It is an object of this invention to provide a new and improved catadioptric system which may be used as a photographic objective.

It is another object of this invention to provide a catadioptric objective that is highly compact in form, is extremely rigid and well balanced, has a long focal length, has a speed that can be made as fast as about f/3.5, is highly corrected for chromatic and spherical aberrations and has a useful field of up to about 7°.

It is still another object of this invention to provide a catadioptric system in which the mirror surfaces are spherical, which contains at most one aspheric surface, which is relatively inexpensive and which is easy to fabricate and test.

It is yet still another object of this invention to provide a catadioptric photographic objective in which the mirror surfaces are spherical and is highly corrected for spherical and chromatic aberrations.

The above and other objects are achieved by constructing a catadioptric system according to this invention.

Basically, the system is made up of a concave spherical primary mirror and a convex spherical secondary mirror. The primary mirror which is formed on one end of an elongated solid support member made of refractive material has a centrally located aperture. The secondary mirror is also formed on one end of an elongated solid support member made of a refractive material. The index of refraction of both support members is preferably the same. The two support members are disposed in mating contact with each other. The system further includes additional refractive members arranged to correct for different aberrations and/or increase the focal length of the system.

One feature of the invention involves the use of an extremely fast primary mirror to achieve a highly compact system.

Another feature of the invention involves the manner of correcting spherical aberrations introduced by the use of spherical mirrors. In one embodiment, the front surface of the front refractive element is made aspheric. In two other embodiments all the curved surfaces of the refractive elements are spherical.

Another feature of the invention involves providing for a doublet in the system which is arranged to increase the focal length of the system without increasing its overall physical length and at the same time help to correct some aberrations.

Another feature of the invention involves the extremely compact manner in which the various components are arranged.

A clearer concept of the scope and purpose of the invention along with other advantages and features thereof will be obtained from the following description taken in conjunction with the drawings, and the particular novel features will be pointed out hereinafter in the appended claims.

BRIEF DESCRIPTION OF DRAWINGS

In the drawings:

FIG. 2 is an optical diagram of another embodiment of the invention; and,

FIG. 3 is an optical diagram of still another embodiment of the invention.

Figure 1:
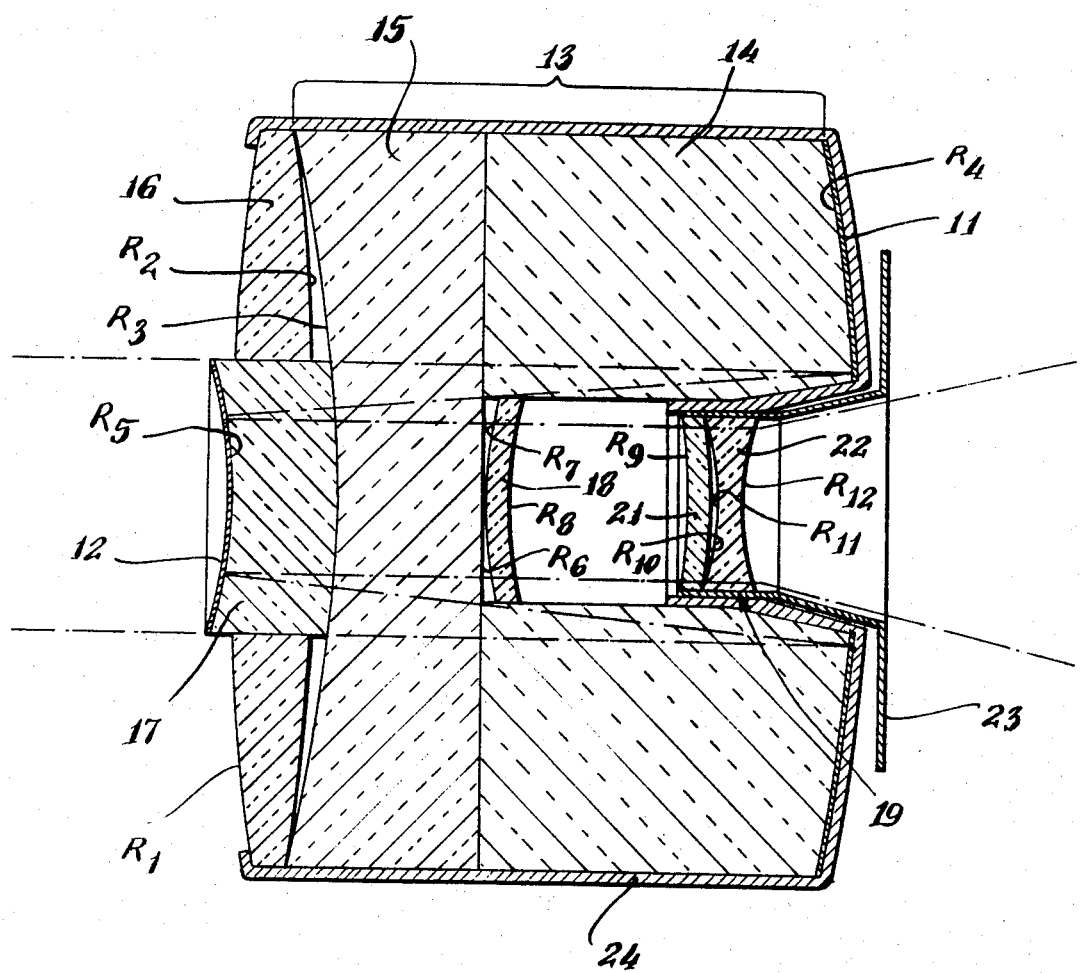
FIG. 1 is an optical diagram of one embodiment of the invention.

In connection with the drawings it is to be noted that in each of the figures the front or object side is to the left and the rear or image side is to the right.

DETAILED DESCRIPTION OF INVENTION

Referring now to FIG. 1, there is shown a catadioptric system which includes a primary mirror 11 and secondary mirror 12. The primary mirror is concave, spherical, faces the object and is provided with a centrally located aperture. The primary mirror 11 is formed directly on the rear surface of a solid primary support component 13. Support component 13 has a convex rear surface. Support component 13 is made of refractive material and includes a rear support element 14 and a front support element 15. Support element 14 is provided with a longitudinal axial aligned aperture extending inward from the rear. The front surface of the support element 14 is in mating contact and preferably cemented to the rear surface of support element 15 which has a concave front surface and is negative in power. As an alternative arrangement component 13 could be in the form of a single element. The front surface of the supporting element 15 is in edge contact with a positive lens element 16. Lens element 16 has a convex, hyperbolic, aspherically shaped front surface. Lens element 16 and the concave front surface of the support element 15 correct primarily for spherical aberration and to some extent for chromatic aberration. Lens element 16 is provided with a centrally located aperture extending from the front to the rear. Located in this aperture is a solid secondary support component 17 made of refractive material. The rear surface of secondary support component 17 has the same radius of curvature as the front surface of the front support element 15, is in mating contact with support element 15 and preferably cemented to it. The front surface of support component 17 is concave. The convex secondary mirror 12 is formed directly on the front surface of the support component 17. Refractive elements 14, 15 and 17 preferably have the same index of refraction so that light reflected from the primary mirror 11 to the secondary mirror 12 to the rear surface of support 15 passes through only a single solid homogeneous medium. The system further includes a lens element 18 and a doublet 19 which are both located in the axial aperture of the refractive supporting element 14. Lens element 18 and doublet 19 serve to increase the focal length and correct for field aberrations. Doublet 19 is made up of a positive element 21 and a negative element 22. Doublet 19 is mounted on a support 23 which is movable axially relative to the main support 24 for purposes of focusing.

As can be seen, the system has edge to edge contact and is effectively "solid" or rigid from the front to the rear. It should be noted that all the curved surfaces are spherical except for the front surface of lens element 16 which as noted above is aspherical. Additionally, it should be noted that in so far as the aspheric surface is a convex hyperbola its accuracy can be tested separately during fabrication.

In the following chart there is listed a table of values for one example of a system constructed according to this embodiment. As is well known in the art, a plus sign is used to denote that a surface is convex to the object and that a distance is measured from left to right whereas a minus sign is used to denote that a surface is concave to the object and that a distance is measured from right to left.

CHART I

Field of view=4°; Relative aperture=f/11; E.F.L.=664.8; Overall length=57.15

| Element | Index | Abbe No. |
|---|---|---|
| 14 | 1.51680 | 64.2 |
| 15 | 1.51680 | 64.2 |
| 16 | 1.51680 | 64.2 |
| 17 | 1.51680 | 64.2 |
| 18 | 1.51680 | 64.2 |
| 21 | 1.67270 | 32.2 |
| 22 | 1.51680 | 64.2 |

| Surface | Radius | Axial distance |
|---|---|---|
| $r_1$ | *203.950 | $r_1$ to $r_2$=7.62 |
| $r_2$ | −176.300 | $r_2$ to $r_3$=1.40 |
| $r_3$ | −112.700 | $r_3$ to $r_4$=47.00 |
| $r_4$ | −151.120 | $r_4$ to $r_5$=−57.15 |
| $r_5$ | −47.152 | $r_5$ to $r_6$=22.86 |
| $r_6$ | ∞ | $r_6$ to $r_7$=0.0 |
| $r_7$ | 51.620 | $r_7$ to $r_8$=2.54 |
| $r_8$ | 24.273 | $r_8$ to $r_9$=15.52 |
| $r_9$ | −77.500 | $r_9$ to $r_{10}$=1.78 |
| $r_{10}$ | −27.406 | $r_{10}$ to $r_{11}$=.51 |
| $r_{11}$ | −23.610 | $r_{11}$ to $r_{12}$=2.79 |
| $r_{12}$ | 39.706 |  |

* Hyperbola; Formula=$-9.62669x^2-587.9x+y^2=0$.

Referring now to FIG. 2 there is shown another embodiment of the invention. This embodiment includes a spherical primary mirror 41, a spherical secondary mirror 42, a primary refractive support component 43 made up of elements 44 and 45, a pair of lens elements 46 and 47, a secondary refractive supporting element 48 and a negative lens element 49. All curved surfaces of the refractive elements are spherical. The two support components preferably have the same index of refraction as in the FIG. 1 embodiment.

In another version of this embodiment, the support component 43 could be in the form of a single component. Additionally, a doublet similar to element 19 in FIG. 1 could be provided to increase the focal length of the system.

In the following chart there is listed a table of values for one example of a system constructed according to this embodiment.

CHART II

Field of view=4°; Relative aperture=f/5; E.F.L.=328.5; Overall length=76.3

| Element | Index | Abbe No. |
|---|---|---|
| 44 | 1.51680 | 64.2 |
| 45 | 1.51680 | 64.2 |
| 46 | 1.51680 | 64.2 |
| 47 | 1.51680 | 64.2 |
| 48 | 1.51680 | 64.2 |
| 49 | 1.51680 | 64.2 |

| Surface | Radius | Axial distance |
|---|---|---|
| $r_1$ | 339.80 | $r_1$ to $r_2$=5.6 |
| $r_2$ | −917.40 | $r_2$ to $r_3$=2.9 |
| $r_3$ | −125.00 | $r_3$ to $r_4$=2.5 |
| $r_4$ | −250.00 | $r_4$ to $r_5$=0.0 |
| $r_5$ | ∞ | $r_5$ to $r_6$=63.6 |
| $r_6$ | −201.00 | $r_6$ to $r_7$=−76.3 |
| $r_7$ | −66.90 | $r_7$ to $r_8$=38.1 |
| $r_8$ | ∞ | $r_8$ to $r_9$=0.0 |
| $r_9$ | 19.76 | $r_9$ to $r_{10}$=2.3 |
| $r_{10}$ | 13.16 |  |

Referring now to FIG. 3, there is shown still another embodiment of the invention. This embodiment also includes a spherical primary mirror 71 and a spherical secondary mirror 72. Primary mirror 71 is formed directly on the rear surface of a solid primary support component 73. Support component 73 is made of refractive material and is provided with a centrally located aperture extending from the front to the rear. Secondary mirror 72 is formed directly on the front surface of a secondary support component 74. Support component 74 is made of refractive material. The two refractive support elements 73 and 74 are positioned in mating contact and are preferably cemented. The system further includes a pair of refractive corrector elements 75 and 76 positioned in front of the refractive support element 74 and a doublet 77 made up of a negative meniscus element 78 and a double convex element 79 located in the aperture of the primary support component 73. All curved surfaces are spherically shaped. The two support components preferably have the same index of refraction as in the FIG. 1 embodiment.

In the following chart there is listed a table of values for one example of a system constructed to this embodiment.

CHART III

Field of view=5°; Relative aperture=$f/3.5$; E. F. L.=12; Overall length=3.73

| Element | Index | Abbe No. |
|---|---|---|
| 73 | 1.45845 | 67.3 |
| 74 | 1.45845 | 67.3 |
| 75 | 1.45845 | 67.3 |
| 76 | 1.45845 | 67.3 |
| 78 | 1.45845 | 67.3 |
| 79 | 1.45845 | 67.3 |

| Surface | Radius | Axial distance |
|---|---|---|
| $r_1$ | 9.7474 | $r_1$ to $r_2$=.3588 |
| $r_2$ | 38.1940 | $r_2$ to $r_3$=.3216 |
| $r_3$ | −7.0556 | $r_3$ to $r_4$=.1794 |
| $r_4$ | −14.5060 | $r_4$ to $r_5$=.0018 |
| $r_5$ | ∞ | $r_5$ to $r_6$=2.8686 |
| $r_6$ | −11.0030 | $r_6$ to $r_7$=−3.5881 |
| $r_7$ | −7.2729 | $r_7$ to $r_8$=1.0764 |
| $r_8$ | 2.4443 | $r_8$ to $r_9$=1.6146 |
| $r_9$ | −1.4253 | $r_9$ to $r_{10}$=.0897 |
| $r_{10}$ | −30.9060 | $r_{10}$ to $r_{11}$=.0018 |
| $r_{11}$ | 2.7602 | $r_{11}$ to $r_{12}$=.2959 |
| $r_{12}$ | −2.5902 | |

What is claimed is:

1. A photographic objective comprising in axial alignment:
   a primary mirror support component (13) having a central aperture extending in from the rear,
   a primary mirror (11) formed on the rear surface of the primary mirror support component (13),
   a secondary mirror support component (17) positioned in front of the primary mirror support component (13),
   a secondary mirror (12) formed on the front surface of the secondary mirror support component (17),
   a first lens component (16) positioned in front of the primary mirror (11),
   a second lens component (18) positioned behind the secondary mirror (12),
   a doublet (19) positioned in back of the second lens component (18), and,
   said components being characterized by the following constructional data:

CHART I

Field of view=4°; Relative aperture=$f/11$; E.F.L.=664.8; Overall length=57.15

| Element | Index | Abbe No. |
|---|---|---|
| 14 | 1.51680 | 64.2 |
| 15 | 1.51680 | 64.2 |
| 16 | 1.51680 | 64.2 |
| 17 | 1.51680 | 64.2 |
| 18 | 1.51680 | 64.2 |
| 21 | 1.67270 | 32.2 |
| 22 | 1.51680 | 64.2 |

| Surface | Radius | Axial distance |
|---|---|---|
| $r_1$ | *293.950 | $r_1$ to $r_2$=7.62 |
| $r_2$ | −176.300 | $r_2$ to $r_3$=1.40 |
| $r_3$ | −112.700 | $r_3$ to $r_4$=47.00 |
| $r_4$ | −151.120 | $r_4$ to $r_5$=−57.15 |
| $r_5$ | −47.152 | $r_5$ to $r_6$=22.86 |
| $r_6$ | ∞ | $r_6$ to $r_7$=0.0 |
| $r_7$ | 51.620 | $r_7$ to $r_8$=2.54 |
| $r_8$ | 24.273 | $r_8$ to $r_9$=15.52 |
| $r_9$ | −77.500 | $r_9$ to $r_{10}$=1.78 |
| $r_{10}$ | −27.406 | $r_{10}$ to $r_{11}$=.51 |
| $r_{11}$ | −23.610 | $r_{11}$ to $r_{12}$=2.79 |
| $r_{12}$ | 39.706 | |

* Hyperbola; Formula=$-9.62669x^2-587.9x+y^2=0$.

2. A photographic objective comprising in axial alignment:
   a primary mirror support component (43) having a central aperture extending in from the rear,
   a primary mirror (41) formed on the rear surface of the primary mirror support component (43),
   a secondary mirror support component (48) positioned in front of the primary mirror support component (43),
   a secondary mirror (42) formed on the front surface of the secondary mirror support component (48),
   a first lens component positioned in front of the primary mirror (41) made up of lens elements (46) and (47),
   a second lens component (49) positioned behind the secondary mirror (42), and,
   said components being characterized by the following constructional data:

CHART II

Field of view=4°; Relative aperture=$f/5$; E.F.L.=328.5; Overall length=76.3

| Element | Index | Abbe No. |
|---|---|---|
| 44 | 1.51680 | 64.2 |
| 45 | 1.51680 | 64.2 |
| 46 | 1.51680 | 64.2 |
| 47 | 1.51680 | 64.2 |
| 48 | 1.51680 | 64.2 |
| 49 | 1.51680 | 64.2 |

| Surface | Radius | Axial distance |
|---|---|---|
| $r_1$ | 339.80 | $r_1$ to $r_2$=5.6 |
| $r_2$ | −917.40 | $r_2$ to $r_3$=2.9 |
| $r_3$ | −125.00 | $r_3$ to $r_4$=2.5 |
| $r_4$ | −250.00 | $r_4$ to $r_5$=0.0 |
| $r_5$ | ∞ | $r_5$ to $r_6$=63.6 |
| $r_6$ | −201.00 | $r_6$ to $r_7$=−76.3 |
| $r_7$ | −66.90 | $r_7$ to $r_8$=38.1 |
| $r_8$ | ∞ | $r_8$ to $r_9$=0.0 |
| $r_9$ | 19.76 | $r_9$ to $r_{10}$=2.3 |
| $r_{10}$ | 13.16 | |

3. A photographic objective comprising in axial alignment:
a primary mirror support component (73) having a central aperture extending in from the rear,
a primary mirror (71) formed on the rear surface of the primary mirror support component (73),
a secondary mirror support component (74) positioned in front of the primary mirror support component (73),
a secondary mirror (72) formed on the front surface of the secondary mirror support component (74),
a first lens component positioned in front of the primary mirror (71) made up of a first lens element (75) and a second lens element (76),
a second lens component made up of a first lens element (78) and a second lens element (79) positioned behind the secondary mirror (72), and,
said components being characterized by the following constructional data:

CHART III

Field of view = 5°; Relative aperture = $f/3.5$; E.F.L. = 12; Overall length = 3.73

| Element | Index | Abbe No. |
|---|---|---|
| 73 | 1.45845 | 67.3 |
| 74 | 1.45845 | 67.3 |
| 75 | 1.45845 | 67.3 |
| 76 | 1.45845 | 67.3 |
| 78 | 1.45845 | 67.3 |
| 79 | 1.45845 | 67.3 |

CHART III—Continued

| Surface | Radius | Axial distance |
|---|---|---|
| $r_1$ | 9.7474 | $r_1$ to $r_2$ = .3588 |
| $r_2$ | 38.1940 | $r_2$ to $r_3$ = .3216 |
| $r_3$ | −7.0556 | $r_3$ to $r_4$ = .1794 |
| $r_4$ | −14.5060 | $r_4$ to $r_5$ = .0018 |
| $r_5$ | ∞ | $r_5$ to $r_6$ = 2.8686 |
| $r_6$ | −11.0030 | $r_6$ to $r_7$ = −3.5881 |
| $r_7$ | −7.2729 | $r_7$ to $r_8$ = 1.0764 |
| $r_8$ | 2.4443 | $r_8$ to $r_9$ = 1.6146 |
| $r_9$ | −1.4253 | $r_9$ to $r_{10}$ = .0897 |
| $r_{10}$ | −30.9060 | $r_{10}$ to $r_{11}$ = .0018 |
| $r_{11}$ | 2.7602 | $r_{11}$ to $r_{12}$ = .2959 |
| $r_{12}$ | −2.5902 | |

References Cited

UNITED STATES PATENTS

| 2,378,301 | 6/1945 | Kaprelian | 350—201 |
| 2,726,574 | 12/1955 | Mandler | 350—199 |
| 3,064,526 | 11/1962 | Lindsay | 350—201X |

FOREIGN PATENTS

| 695,297 | 8/1953 | Great Britain | 350—201 |

JOHN K. CORBIN, Primary Examiner

U.S. Cl. X.R.

350—201